(12) United States Patent
Mouly et al.

(10) Patent No.: US 11,808,344 B2
(45) Date of Patent: Nov. 7, 2023

(54) PLANET CARRIER FOR A MECHANICAL GEARBOX OF AN AIRCRAFT TURBOMACHINE

(71) Applicant: SAFRAN TRANSMISSION SYSTEMS, Colombes (FR)

(72) Inventors: Guillaume Pierre Mouly, Moissy-Cramayel (FR); Frederic Nicolas François Laisnez, Cergy (FR); Adrien Louis Simon, Saint-Denis (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 40 days.

(21) Appl. No.: 17/568,093

(22) Filed: Jan. 4, 2022

(65) Prior Publication Data
US 2022/0213956 A1    Jul. 7, 2022

(30) Foreign Application Priority Data

Jan. 5, 2021    (FR) ...................................... 2100060

(51) Int. Cl.
*F16H 57/04* (2010.01)
*F02C 7/36* (2006.01)
*F16H 57/08* (2006.01)

(52) U.S. Cl.
CPC ............ *F16H 57/046* (2013.01); *F02C 7/36* (2013.01); *F16H 57/0479* (2013.01); *F16H 57/0486* (2013.01); *F16H 57/082* (2013.01)

(58) Field of Classification Search
CPC ............... F16H 57/0431; F16H 57/046; F16H 57/0479; F16H 57/0486; F16H 57/082; F02C 7/36
See application file for complete search history.

(56) References Cited

U.S. PATENT DOCUMENTS 8,777,793 B2 *   7/2014   Sheridan ................. F01D 25/16
                                                  475/331

FOREIGN PATENT DOCUMENTS

| CN | 107781402 B | 4/2020 |
|---|---|---|
| FR | 2 987 416 A1 | 8/2013 |
| FR | 3 008 462 A1 | 1/2015 |
| FR | 3 008 463 A1 | 1/2015 |
| FR | 3 041 054 A1 | 3/2017 |
| FR | 3 035 773 A1 | 11/2018 |
| FR | 3 073 915 A1 | 5/2019 |
| FR | 3 084 428 A1 | 1/2020 |

(Continued)

OTHER PUBLICATIONS

France Search Report dated Aug. 23, 2021, issued in Application No. FR2100060, filed Jan. 5, 2021, 7 pages.

*Primary Examiner* — Erin D Bishop
(74) *Attorney, Agent, or Firm* — CHRISTENSEN O'CONNOR JOHNSON KINDNESS PLLC

(57) ABSTRACT

A planet carrier for a mechanical gearbox for a turbomachine includes a one-piece cage that extends about an axis of rotation defining an internal housing configured to receive a sun gear and planet gears of the gearbox. The planet carrier further includes a lubrication system with at least one bore formed in the cage and extending parallel to the axis over more than 30% of a maximum axial dimension (Lmax) of the cage. The lubrication system also includes for the at least one bore, at least two sprinklers which are fitted to the cage and which are each mounted in a recess of the cage.

13 Claims, 6 Drawing Sheets

(56) References Cited

FOREIGN PATENT DOCUMENTS

FR        3 092 889 A1    8/2021
WO    2010/092263 A1    8/2010

\* cited by examiner

PLANET CARRIER FOR A MECHANICAL GEARBOX OF AN AIRCRAFT TURBOMACHINE

CROSS-REFERENCE TO RELATED APPLICATION

This application claims priority to FR 2100060, filed Jan. 5, 2021, the disclosure of which is hereby expressly incorporated by reference herein in its entirety.

TECHNICAL FIELD

The present disclosure relates to the field of the mechanical gearboxes for turbomachines, in particular for aircraft.

BACKGROUND

The prior art comprises in particular the documents WO-A1-2010/092263, FR-A1-2 987 416, FR-A1-3 008 462, FR-A1-3 008 463, FR-A1-3 041 054, FR-A1-3 065 773, FR-A1-3 073 915, FR-A1-3 084 428 and FR-A1-3 092 889.

The role of a mechanical gearbox is to modify the speed and torque ratio between the input shaft and the output shaft of a mechanical system.

The new generations of double-flow turbomachines, in particular those with a high dilution ratio, comprise a mechanical gearbox to drive the shaft of a fan. The usual purpose of the gearbox is to convert the speed rotation referred to as high speed of the shaft of a power turbine into a slower speed of rotation for the shaft driving the fan.

Such a gearbox comprises a central pinion, referred to as sun gear, a ring gear and pinions referred to as planet gears, which are engaged between the sun gear and the ring gear. The planet gears are held by a frame referred to as planet carrier. The sun gear, the ring gear and the planet carrier are planetary gears because their axes of revolution coincide with the longitudinal axis X of the turbomachine. The planet gears each have a different axis of revolution equally distributed on the same operating diameter around the axis of the planetary gears. These axes are parallel to the longitudinal axis X.

There are several gearbox architectures. In the prior art of the double-flow turbomachines, the gearboxes are of the planetary or epicyclic type. In other similar applications, there are architectures referred to as differential or "compound".

In a planetary gearbox, the planet carrier is stationary, and the ring gear is the output shaft of the device which rotates in the opposite direction of the sun gear.

In an epicyclic gearbox, the ring gear is stationary, and the planet carrier is the output shaft of the device which rotates in the same direction as the sun gear.

On a compound gearbox, no element is attached in rotation. The ring gear rotates in the opposite direction of the sun gear and the planet carrier.

The gearboxes can consist of one or more gear stages. This meshing is ensured in different ways such as by contact, friction or magnetic field.

The gearboxes require an oil supply to lubricate and cool the gears, splines, rollers and bearings. If the planet carrier is rotating, the oil at the level of the planet gear bearings or gears must be applied in a rotating field. It is therefore necessary to transfer the oil from the reservoir located on a stator portion to the rotating planet carrier which carries oil sprinklers. This transfer is commonly done by means of an OTB (Oil Transfer Bearing).

However, once in the rotating field, the oil is no longer under pressure. At high speeds, it is difficult to reach all the areas to be lubricated with oil because of the centrifugal effect. It is therefore essential to move the sprinklers as close as possible to these areas. Another problem is the complexity of assembling these sprinklers.

The document CN-B-107781402 proposes a planet carrier comprising a multitude of machined passages that supplies sprinklers and whose ends are sealed with watertight caps. However, the number of passages and caps is relatively large and there is a significant risk of damage to the planet carrier when machining the passages, and of leakage from the passages due to incorrect assembly of the caps.

The disclosed subject matter provides an improvement to this technology that allows to solve some or all of the problems of the prior art.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure relates to a planet carrier for a mechanical gearbox for a turbomachine, in particular for an aircraft, this planet carrier comprising:

a one-piece cage that extends about an axis X of rotation defining an internal housing configured to receive a sun gear and planet gears of the gearbox, and a lubrication system comprising:

at least one bore formed in the cage and extending parallel to the axis X over more than 30% of a maximum axial dimension of the cage, and for said or each bore, at least two sprinklers fitted to the cage, each of these sprinklers being mounted in a recess of the cage and comprising:

at least one oil spray orifice, and an internal passage for fluidly communicating said at least one orifice with said bore.

characterised in that the lubrication system comprises, for said or each bore, said at least two sprinklers comprise a longitudinal sprinkler which extends in a direction parallel to the axis X and which is mounted in a recess which is directly connected to a longitudinal end of the bore.

The disclosed subject matter thus provides an improved lubrication system for gearbox planet carriers, which essentially comprises an axial bore connected to a plurality of sprinklers fitted and connected as close as possible and preferably directly to this axial bore. The axial bore can be made simply by machining the planet carrier. The bore extends over a significant portion of the axial dimension of the cage, i.e., it is not a simple orifice in a wall for example. The housing recesses for the sprinklers can also be made by machining. The sprinklers are then pressed into these recesses, either shrunk or held in place by a screw.

The lubrication system may comprise a plurality of axial bores distributed around the aforementioned axis. The number of bores is, for example, a function of the number of planet gears of the gearbox, and is, for example, equal to the number of planet gears of the gearbox.

The disclosed subject matter is compatible with the oil supply of non-centrifugal rollers, gears, splines, etc. It is also suitable for an oil supply via OTB.

The planet carrier according to the present disclosure may comprise one or more of the following characteristics, taken alone from each other, or in combination with each other:

the lubrication system comprises, for said or each bore, at least one transverse sprinkler which extends in a direction perpendicular to the axis X and which is mounted in a recess which is directly connected to the bore;

the recess for mounting the transverse sprinkler is located at a longitudinal end of said bore;

the transverse sprinkler comprises a lateral orifice for fluidly communicating said bore with the passage of this transverse sprinkler;

the recess for mounting the transverse sprinkler opens into said bore spaced from the longitudinal ends of said bore;

at least one of said sprinklers is generally tubular in shape and comprises a peripheral annular groove for receiving an O-ring seal;

at least one of the sprinklers comprises an external cylindrical centring surface configured to cooperate directly with a complementary internal cylindrical surface of said cage;

at least one of the sprinklers comprises two or three external cylindrical centring surfaces, spaced apart from each other;

at least one of the sprinklers comprises an indexing flat and/or an annular collar on its external cylindrical surface or on one of its external cylindrical surfaces;

at least one of the sprinklers comprises two or three or more spray orifices, which are aligned one behind the other and are formed in an external boss of the sprinkler;

at least one of the sprinklers comprises a single spray orifice which extends directly into the extension of the internal passage of that sprinkler;

the planet carrier comprises:
  a longitudinal sprinkler connected directly to a longitudinal end of said bore,
  a transverse sprinkler connected directly to an opposite longitudinal end of said bore, and
  one, two or more additional transverse sprinklers connected to said bore, spaced from the longitudinal ends of said bore.

The disclosure further relates to a mechanical gearbox equipped with a planet carrier as described above.

The disclosure also relates to a turbomachine, in particular for aircraft, comprising a mechanical gearbox equipped with a planet carrier as described above.

DESCRIPTION OF THE DRAWINGS

The foregoing aspects and many of the attendant advantages of this present disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosed subject matter.

Figure 1:
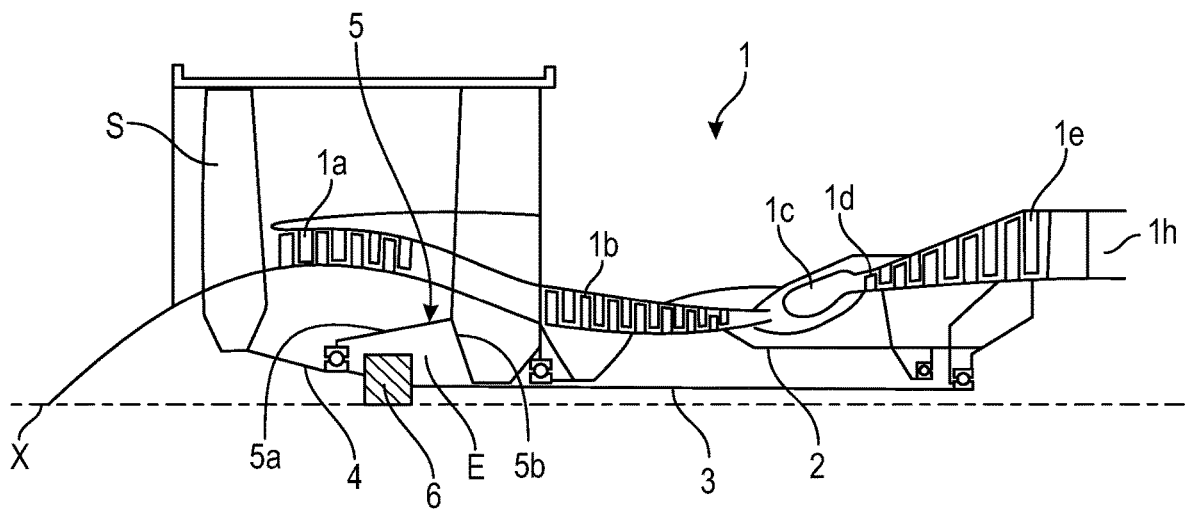
FIG. 1 is a schematic axial sectional view of a turbomachine according to aspects of the present disclosure.

FIG. 1 describes a turbomachine 1 which conventionally comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together they form a high-pressure (HP) body. The low-pressure compressor 1a and the low-pressure turbine 1e are connected by a low-pressure shaft 3 and together they form a low-pressure (LP) body.

The fan S is driven by a fan shaft 4 which is driven by the LP shaft 3 by means of a gearbox 6. This gearbox 6 is generally of the planetary or epicyclic type.

The following description relates to a gearbox of the epicyclic type, in which the planet carrier and the sun gear are rotatable, the ring gear of the gearbox being stationary in the frame of reference of the engine.

The gearbox 6 is positioned in the upstream portion of the turbomachine. A stationary structure comprising schematically, here, an upstream portion 5a and a downstream portion 5b which makes up the engine casing or stator 5 is arranged so as to form an enclosure E surrounding the gearbox 6. This enclosure E is closed upstream by seals at the level of a bearing allowing the passage of the fan shaft 4, and downstream by seals at the level of the passage of the LP shaft 3.

Figure 2:
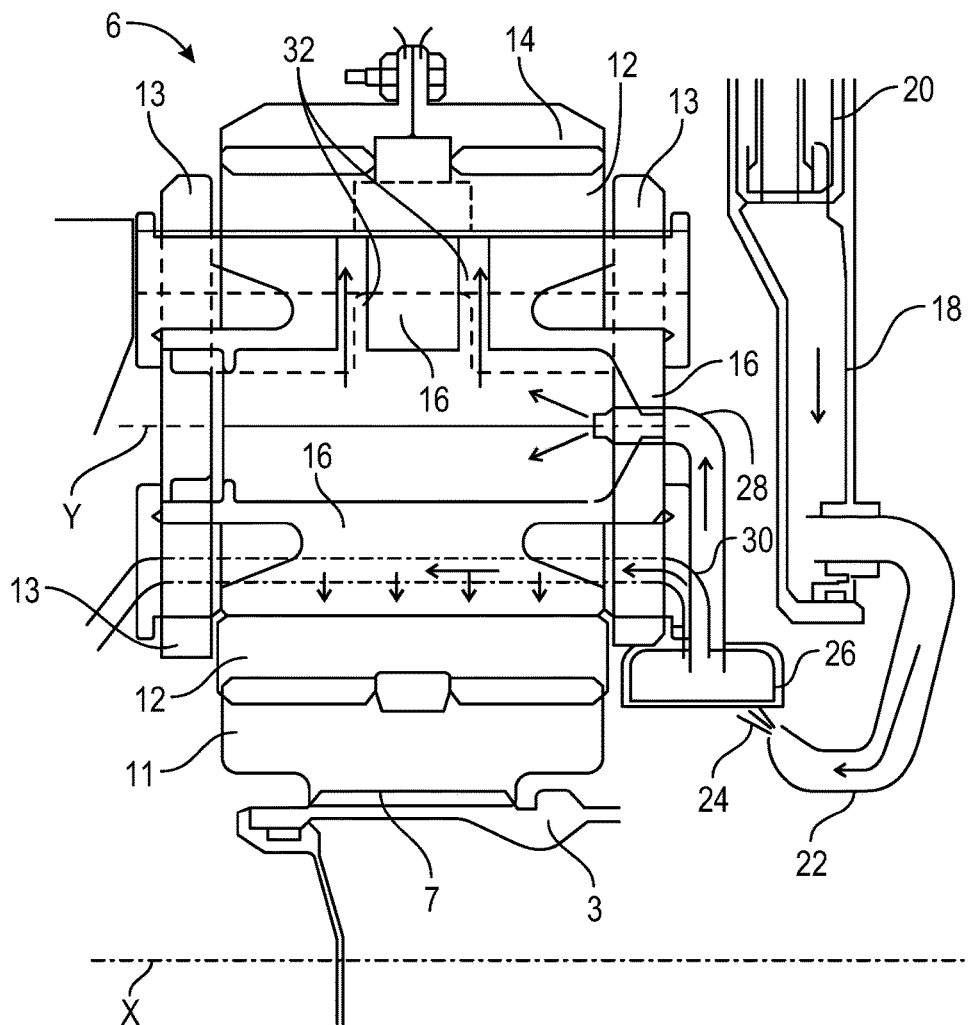
FIG. 2 is a partial axial sectional view of a mechanical gearbox.

With reference to FIG. 2, the gearbox 6 comprises a ring gear 14 which is attached by means of a ring gear carrier (not shown) to the stator 5 with flexible means arranged to allow it to follow the possible movements of the fan shaft 4, in certain degraded operating cases for example. In a planetary architecture, the ring gear carrier is composed of a more or less flexible portion which drives the ring gear and of a portion maintained by roller bearings or bearings and on which the fan is mounted.

The gearbox 6 is meshed on the one hand to the LP shaft 3 by means of splines 7 which drive a planetary or sun gear 11 pinion, and on the other hand to the fan shaft 4 which is attached to a planet carrier 13. Classically, the sun gear 11, whose axis of rotation X coincides with that of the turbomachine 1, drives a series of planet gear pinions referred to as planet gears 12, which are evenly distributed around the circumference of the gearbox 6. The number of planet gears 12 is generally defined as between three and seven.

The planet gears 12 also rotate around the axis X of the turbomachine except in the case of a planetary where they rotate only around their axes of revolution, by meshing with the internal toothings of the ring gear 14.

Each of the planet gears 12 rotates freely about a planet gear axis/bearing 16 connected to the planet carrier 13, by means of a bearing which may be plain, as shown in FIG. 2, or a rolling-element bearing (ball or roller bearings).

The rotation of the planet gears 12 about their planet gear axis 16, due to the cooperation of their pinions with the toothing of the ring gear 14, causes the rotation of the planet carrier 13 about the axis X, and consequently that of the fan shaft 4 linked to it, at a speed of rotation which is lower than that of the LP shaft 3.

FIG. 2 shows the delivery of the oil to the gearbox 6 and its path through the it. Arrows show in FIG. 2 the delivery followed by the oil from, in this example, a buffer reservoir 18 linked to the stator 5 of the turbomachine, to the pinions and bearings to be lubricated.

The buffer reservoir 18 is positioned next to the gearbox 6, at the top portion so that the oil can flow towards the centre of the gearbox by gravity. This reservoir 18 is supplied by a delivery pipeline 20 from the main reservoir of the engine (not shown). The oil flows from the buffer reservoir 18 to open into an injector 22, the calibrated end of which is constricted to form a sprinkler.

The oil emerges from the sprinkler as a jet 24, which is formed by the pressure produced jointly by the pressure of the supply pump and the weight of the oil column located above it. This jet 24 is oriented with a radial component directed towards the outside of the engine and ends up in a cylindrical cup 26 with a radial cross-section shaped like a U, the opening of the U is oriented in the direction of the axis X. While the injector 22 is stationary, the cup 26 is rotatable about the axis X and has a U-shaped portion opposite the sprinkler at all times. The cup 26 forms an oil retaining cavity, this oil being rotated by the cup 26 into the bottom of which it is compressed under the action of the centrifugal force.

From the bottom of the cup 26, a series of pipelines for supplying oil to the various members of the gearbox 6 to be lubricated. These pipelines are essentially of two types. A first series of pipelines 28, which are evenly distributed around the periphery of the gearbox 6 and equal in number to that of the planet gears 16, extend from the bottom of the cup 26 and penetrate into an internal cavity of each planet gear 16, which is closed by the planet carrier 13. A second series of pipelines 30, which are also evenly distributed around the periphery of the gearbox, extend from the bottom of the cup 26 into the space located between two consecutive planet gears 13.

The oil flowing through the first pipelines 28 enters the internal cavity of each planet gear shaft and then, due to centrifugal force, passes into guiding channels 32, which pass through these shafts in a radial direction. These channels 32 open at the periphery of the planet gear axes, at the level of their bearings supporting the planet gears 16 and thus ensure the lubrication of these bearings.

The second pipelines 30 run from the bottom of the cup 26 between the planet gears 16 and generally divide into several channels (not shown) which deliver the oil to the gears formed by the planet gears 16, the sun gear 11 and the ring gear 14.

All the bearings and gears of the gearbox 10 are thus lubricated by the oil which comes from the sprinkler 22 and is collected by the cup 26 located in front of it.

In another technology not shown, the oil supply of the lubrication system of the gearbox 6 is achieved by means of an OTB which allows the oil to be transferred from a stationary reference frame to a rotating reference frame without the need for injectors or sprinklers.

FIGS. 3 to 10 illustrate an embodiment of a planet carrier 113 and a gearbox 106 according to the present disclosure.

The elements of the gearbox 106 and the planet carrier 113 described above are referred to by the same references below, increased by one hundred. The foregoing description applies to the gearbox 106 and the planet carrier 113 to the extent that it does not conflict with or contradict the following.

Figure 3:
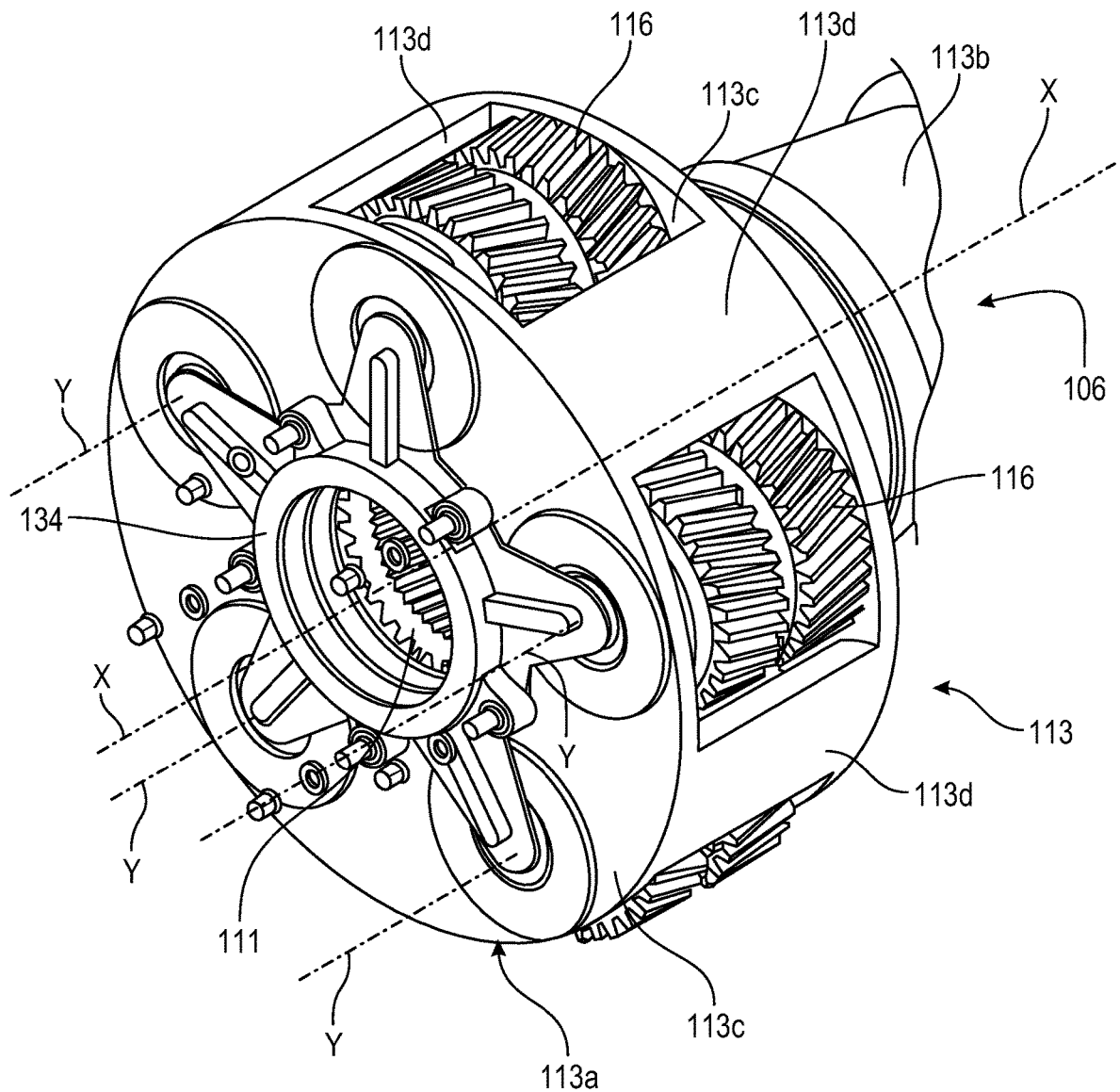
FIG. 3 is a partial schematic perspective view of a mechanical gearbox.

The planet carrier 113 of the gearbox 106 partially shown in FIG. 3 is one-piece and comprises a cage 113a formed in one piece with a tubular barrel 113b for driving the fan shaft 4. In other words, this technology is preferred over the technology in which the planet carrier 113 comprises the assembly of a cage with a cage carrier.

The cage 113a of the planet carrier 113 comprises two substantially radial annular walls 113c which are connected together at their external periphery by bridges 113d.

The cage 113a defines an internal housing configured to receive the sun gear 111 and the planet gears 116. One of the walls 113c is connected to the barrel 113b and the other of the walls 113c comprises orifices for mounting the sun gear 111 and the planet gears 116.

The bridges 113d define circumferential spaces between them that are partially occupied by the toothings of the planet gears 116.

As discussed above with respect to FIG. 2, the function of the lubrication system of the gearbox 106 is generally to supply oil to the bearings of the planet gears 116 and the gears of the gearbox 106.

In the illustrated example, the oil supply to the planet gears 116 is provided by an impeller 134 which is fitted and secured to the wall 113c opposite the barrel 113b, being centred on the axis X.

The disclosed subject matter may relate to the oil lubrication of the gears of the gearbox 106 and/or the lubrication of the bearings of the planet gears 116, which is achieved by sprinklers.

Figure 4:
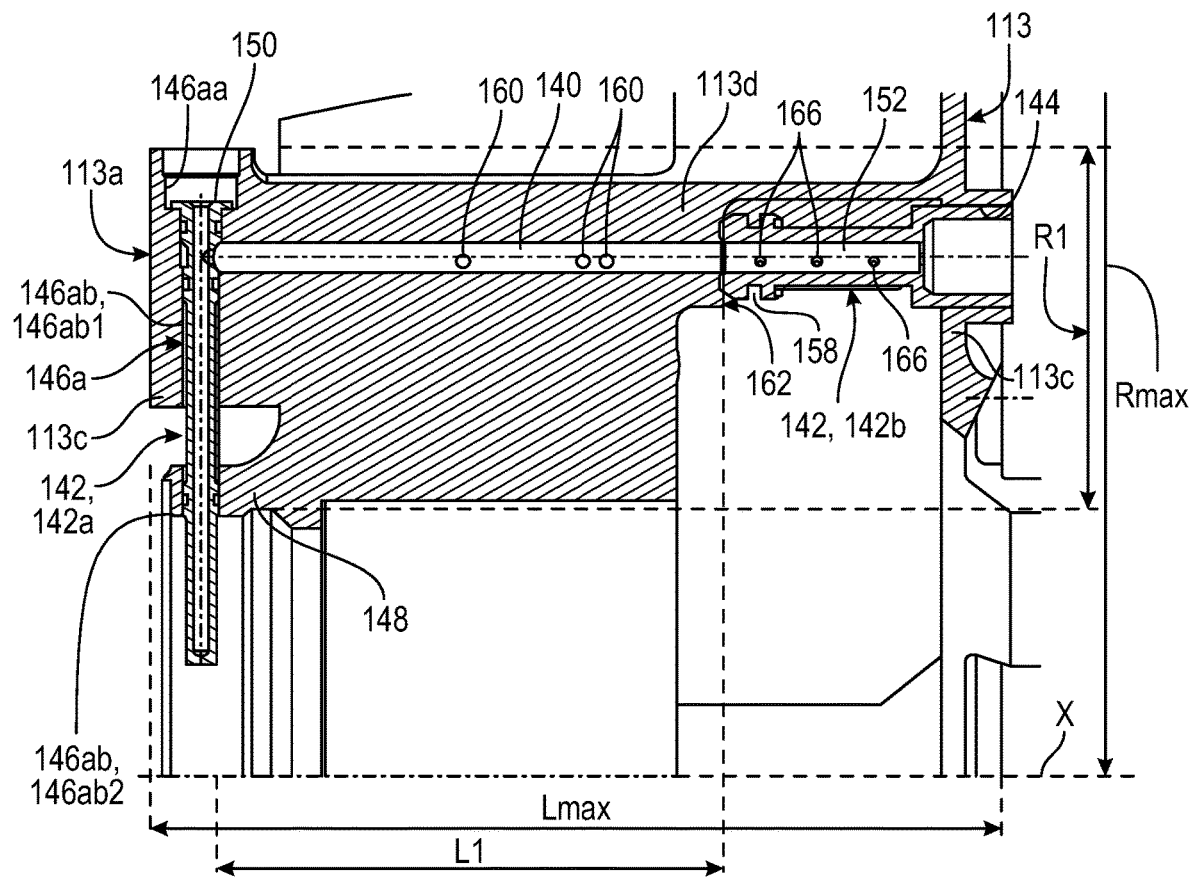
FIG. 4 is a partial schematic view in axial section of a planet carrier for an aircraft turbomachine mechanical gearbox.

FIG. 4 shows a partial axial cross-sectional view of a planet carrier 113 according to the present disclosure, the cross-sectional plane passing through one of the aforementioned bridges 113d.

According to aspects of the present disclosure, the cage 113a of the planet carrier 113 comprises at least one bore 140 that extends parallel to the axis X and oil sprinklers 142 that are fitted on the cage 113a and fluidly connected to the bore 140.

The bore 140 has a longitudinal extent L1 of more than 30%, and preferably more than 50%, of a maximum axial dimension Lmax of the cage 113a. This bore 140 may be formed by machining, and for example by drilling, from one of the walls 113c of the cage. In the example shown, the bore 140 is formed through a recess 144 in the wall 113c connected to the barrel 113b.

FIG. 4 shows two sprinklers 142a, 142b fitted on the cage 113a.

The sprinkler 142a is a transverse sprinkler in that it extends in a transverse or perpendicular direction with respect to the axis X and thus with respect to the bore 140. The sprinkler 142a is housed in a transverse recess 146a which is located at a longitudinal end of the bore 140 and proximate to the wall 113c opposite the barrel 113b.

The recess 146a is formed from the external periphery of the cage 113a and thus one of the bridges 113d. The recess 146a comprises two coaxial cylindrical surfaces 146aa, 146ab of different diameters, the first surface 146aa of larger diameter opening to the external periphery of the cage 113a and the second surface 146ab of smaller diameter extending from the surface 146aa radially inwardly and having, for example, a radial extent R1 of more than 30%, and preferably more than 50%, of a maximum radial dimension Rmax of the cage 113a.

As can be seen in FIG. 4, the bore 140 opens into the recess 146a on its surface 146ab. This surface 146ab is interrupted here and comprises a radially external portion 146ab1 and a radially internal portion 146ab2 separated from each other by an annular gorge formed in the wall 113c and opening in the axial direction. The portion 146ab2 is thus formed in a cylindrical rim 148 of the wall 113c extending about the axis X.

This rim 148 is preferably directly connected to the fan shaft 4 visible in FIG. 1 so that the torque transmitted by the gearbox 6 to the fan shaft 4 passes through this rim 148. The aforementioned annular gorge allows the transmission forces of the torque to be distributed in the planet carrier 113.

Figure 7:
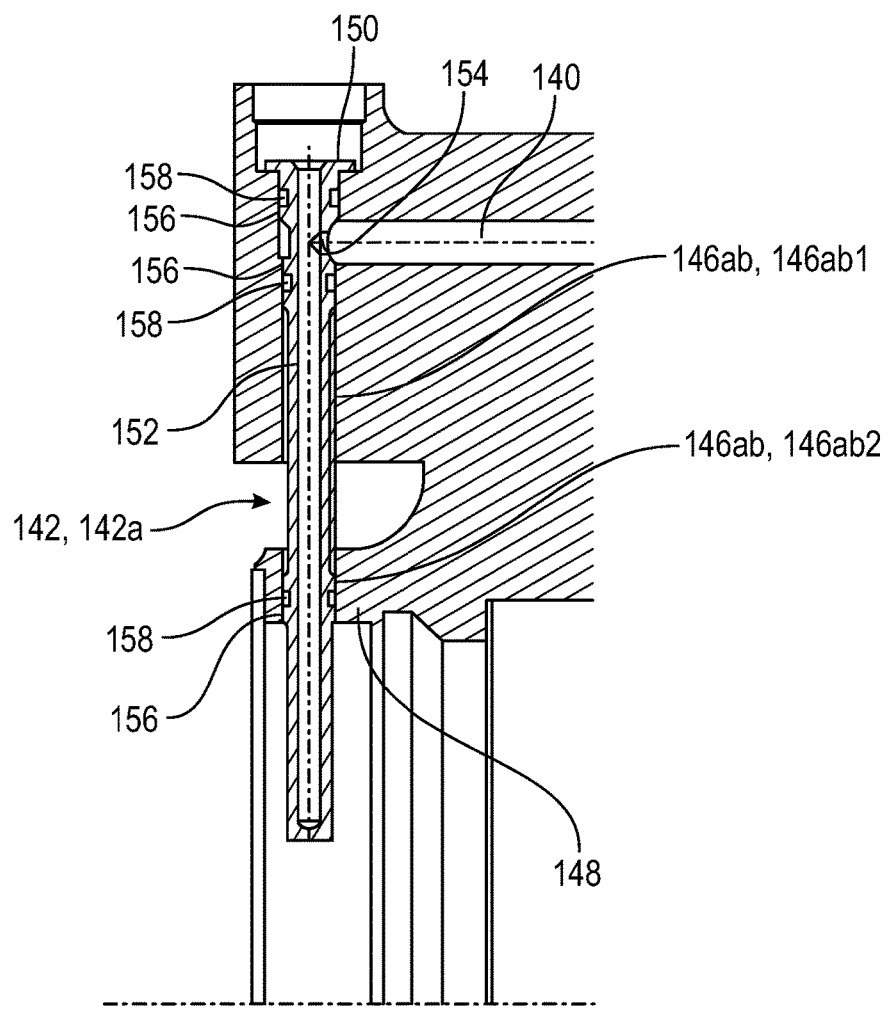
FIG. 7 is an enlarged view of a portion of FIG. 4.
Figure 8:
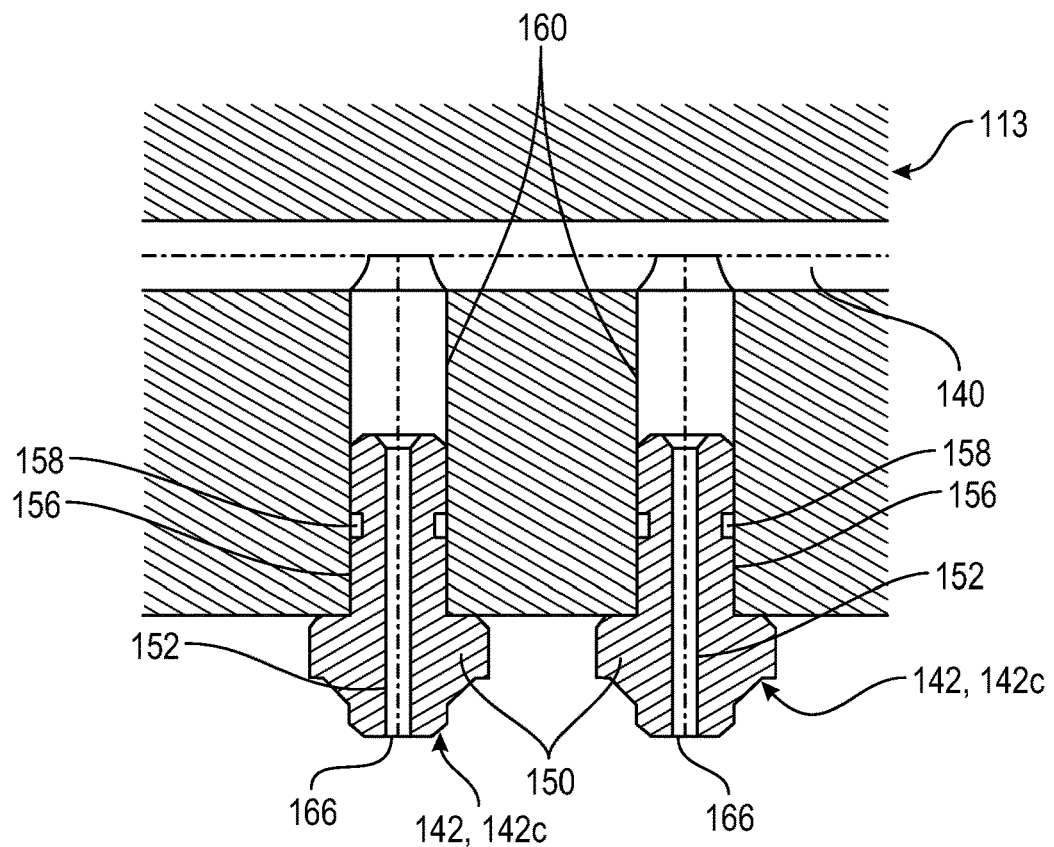
FIG. 8 is another partial schematic axial section view of the planet carrier of FIG. 4.
Figure 9:
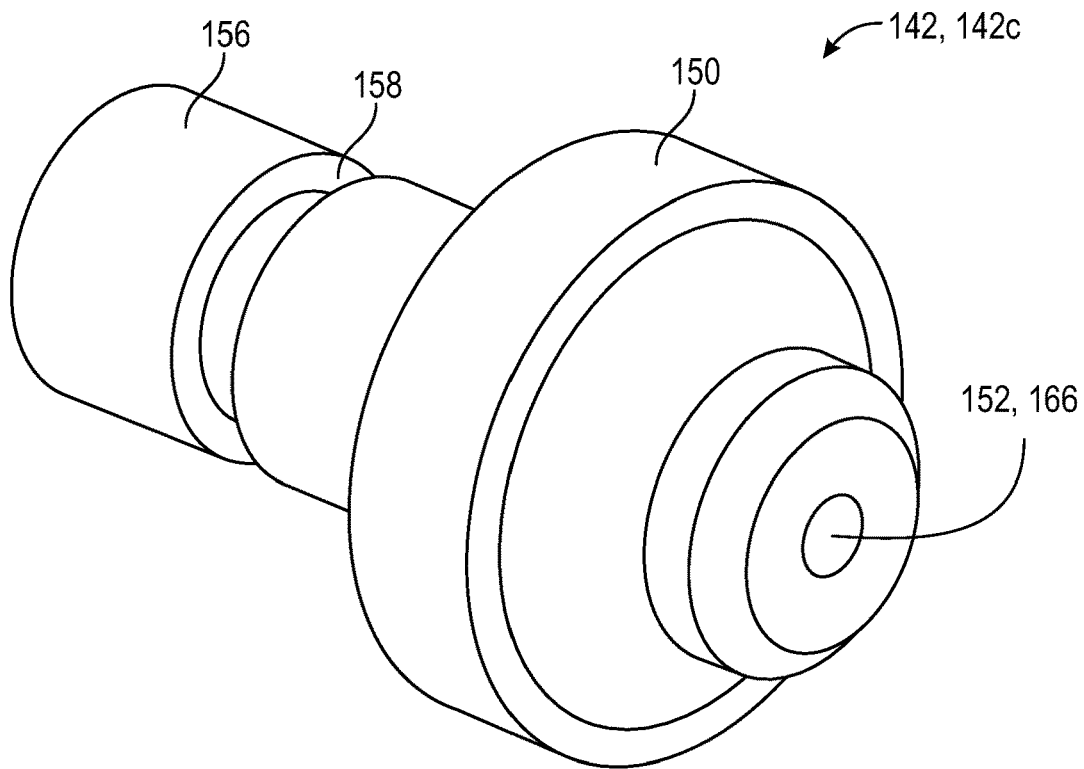
FIG. 9 is a schematic perspective view of a third embodiment of a sprinkler for a planet carrier according to aspects of the present disclosure.

The sprinkler 142a is best seen in FIG. 7 and is generally tubular in shape and comprises an annular collar 150 at one longitudinal end. The sprinkler 142a is intended to be engaged in the recess 146a radially from the outside, until its collar 150 rests on the cylindrical shoulder connecting the surfaces 146aa, 146ab of the recess 146.

Preferably, a cap (not shown) is fitted to the collar 150 and into the surface 142aa to retain the sprinkler in a radially outward direction and to seal the radially external end of the sprinkler 142a.

The sprinkler 142a comprises at least one oil spray orifice and an internal passage 152 for fluidly communicating this orifice with the bore 140. To this end, the sprinkler 142a comprises a transverse orifice 154 that is formed opposite the outlet of the bore. To ensure the alignment of the orifice 154 and the bore 140, the sprinkler 142a, and in particular its collar 150, may comprise a means for indexing with a complementary means of the cage (these means being intended to cooperate together by form-fit, for example).

The sprinkler 142a comprises external cylindrical centring surfaces 156 intended to cooperate with the surface 146ab of the recess 146a. Each of these surfaces 156 comprises a peripheral annular groove 158 for receiving an O-ring seal (not shown). Two of the surfaces 156 are located on either side of the orifice 154, respectively, to ensure that the fluidic connection between the bore 140 and the sprinkler 142a is sealed. Another of the surfaces 156 is located in the portion 146ab2 and ensures the centring of the sprinkler 142a in this area.

The clearances between the sprinkler 142a and the surfaces 146aa, 146ab, in particular between the adjacent surfaces 146, allow to avoid subjecting the sprinkler 142a to stresses during the transmission of the aforementioned torque which could lead to deformations of the planet carrier 113 and in particular of its rim 148.

Figure 10:
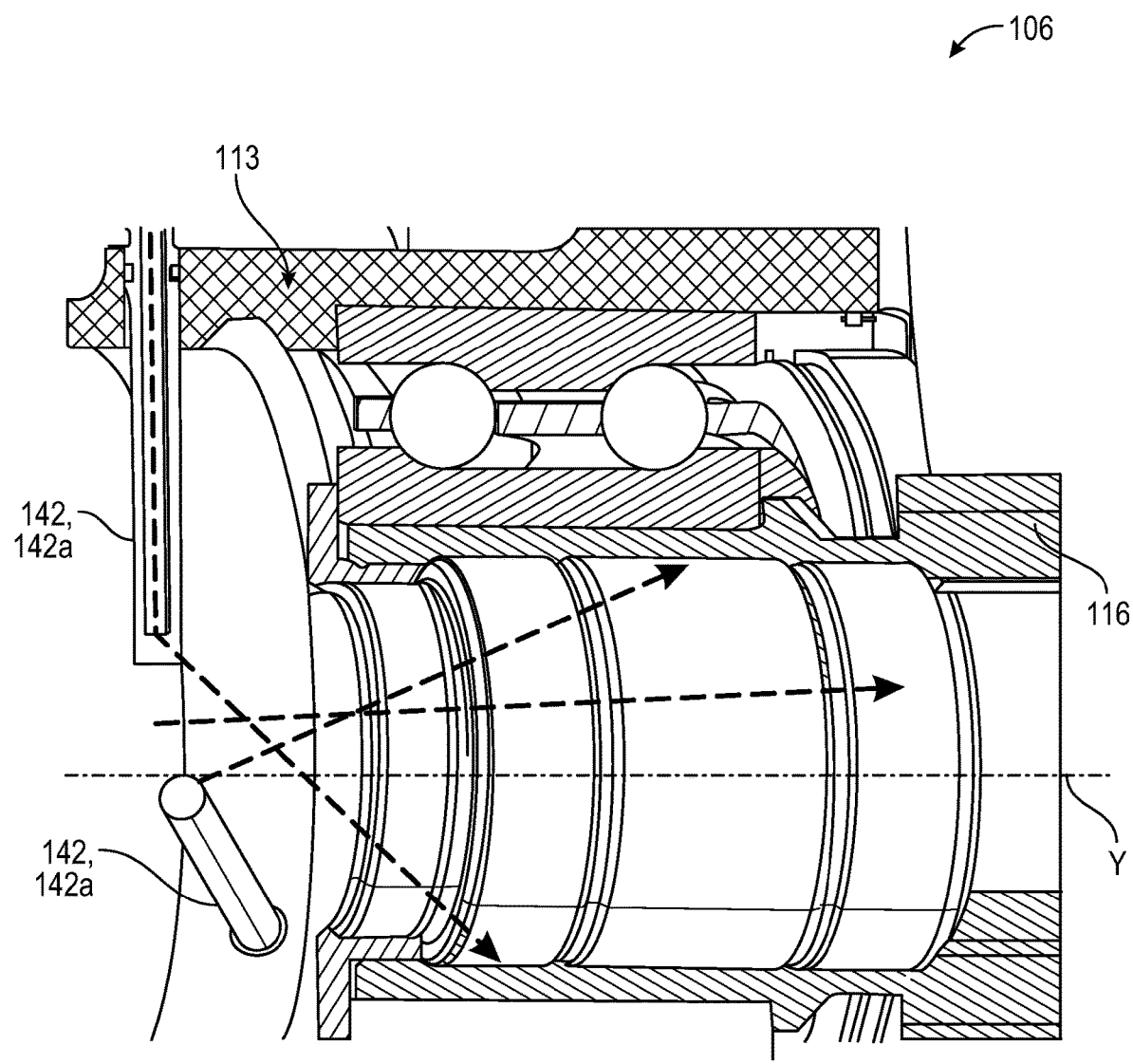
FIG. 10 is a partial schematic view in perspective and axial section of a mechanical gearbox according to aspects of the present disclosure.

The sprinkler 142a may comprise one or more oil spray orifices, for example at its radially internal end. These orifices may be oriented and configured to lubricate the coupling between the splines of the sun gear 111 and the LP shaft. Alternatively, and as shown in FIG. 10, the sprinkler 142a could be used to supply oil to an internal cavity of a planet gear 116. This same figure allows to show that this cavity may be supplied by more than one sprinkler 142a of the aforementioned type, the sprinkler 142a preferably being angularly distributed about the axis Y of rotation of the planet gear 116. This distribution is preferably regular so that the planet carrier 113 is axi-symmetrical from a point of view of the position of the sprinklers but also ideally from a point of view of their mass distribution. In the illustrated case, only the orientation of the oil spray orifices at the ends of the sprinklers 142 may differ from one sprinkler to another, so as to lubricate different areas (e.g., 3) of the internal cavity.

The sprinkler 142b is a longitudinal or axial sprinkler in that it extends parallel to the axis X and is in particular aligned with the bore 140. The sprinkler 142b is housed in the aforementioned recess 144.

Figure 5:
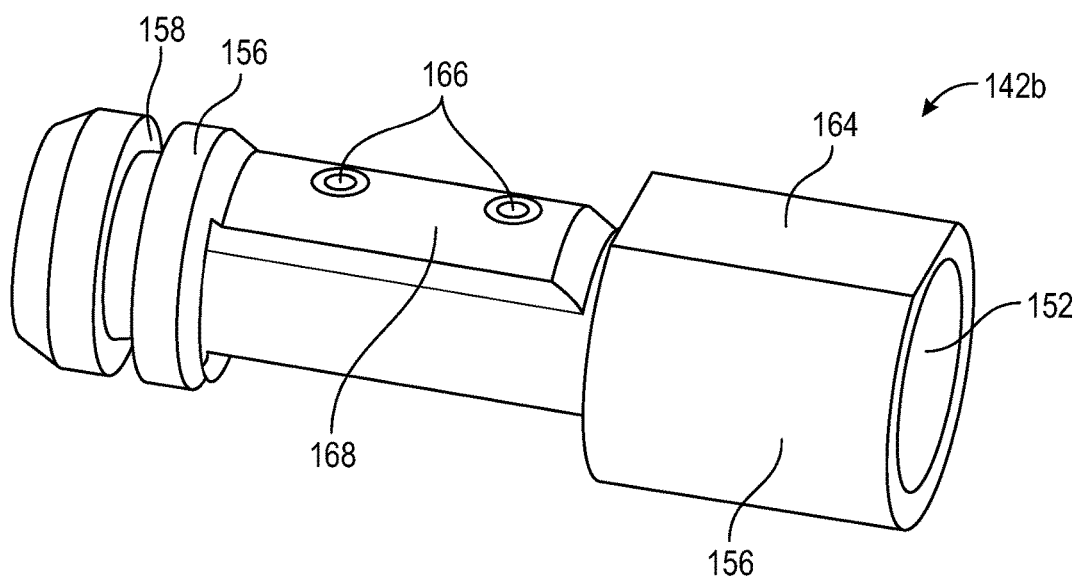
FIG. 5 is a schematic perspective view of a first embodiment of a sprinkler for a planet carrier.

The sprinkler 142b, best seen in FIG. 5, is generally tubular in shape and comprises sections of varying diameters. The sprinkler 142b is intended to be engaged in the recess 144 in the axial direction, until one of its longitudinal ends is in axial abutment against a bearing surface 162 of the cage on which the end of the bore 140 opposite the sprinkler 142a opens.

In this area, the cage 113a could comprise a female housing for engaging the longitudinal end of the sprinkler 142b. The sealing would then be provided by an O-ring housed in a peripheral annular groove 158 in that end of the sprinkler, as shown in the drawings.

The opposite end of this sprinkler 142b comprises a larger diameter section that comprises an external cylindrical surface 156 for centring in the recess 144. The sprinkler 142b, and in particular the surface 156 thereof, may comprise a means for indexing with a complementary means of the cage. In the illustrated example, the surface 156 comprises a flat 164 thus intended to cooperate by shape connection with a complementary flat of the recess 144.

The larger diameter section of the sprinkler 142b may be configured to receive an oil inlet connection member by male-female fitting.

The sprinkler 142b comprises a plurality of oil spray orifices 166 and an internal passage 152 for fluidly communicating these orifices 166 with the bore 140. The passage 152 extends over the entire axial dimension of the sprinkler 142b and opens at both axial ends thereof. The orifices 166 are aligned one behind the other and are formed in an external boss 168 of the sprinkler 142b. The boss 168 allows to extend the longitudinal dimension of the orifices 166 and improves the guidance of the oil to increase the accuracy of the oil jet output. The indexing by means of the flat 164 allows the orifices 166 to be oriented in a selected direction, for example, toward the gears between the toothings of a planet gear 116 and the sun gear 111 or between the toothings of a planet gear 116 and the ring gear 114.

In the event that the planet carrier 113 comprises a plurality of sprinklers 142b, these sprinklers 142b would be equally distributed about the axes Y of the planet gears or the axis X of the gearbox 106.

Figure 6:
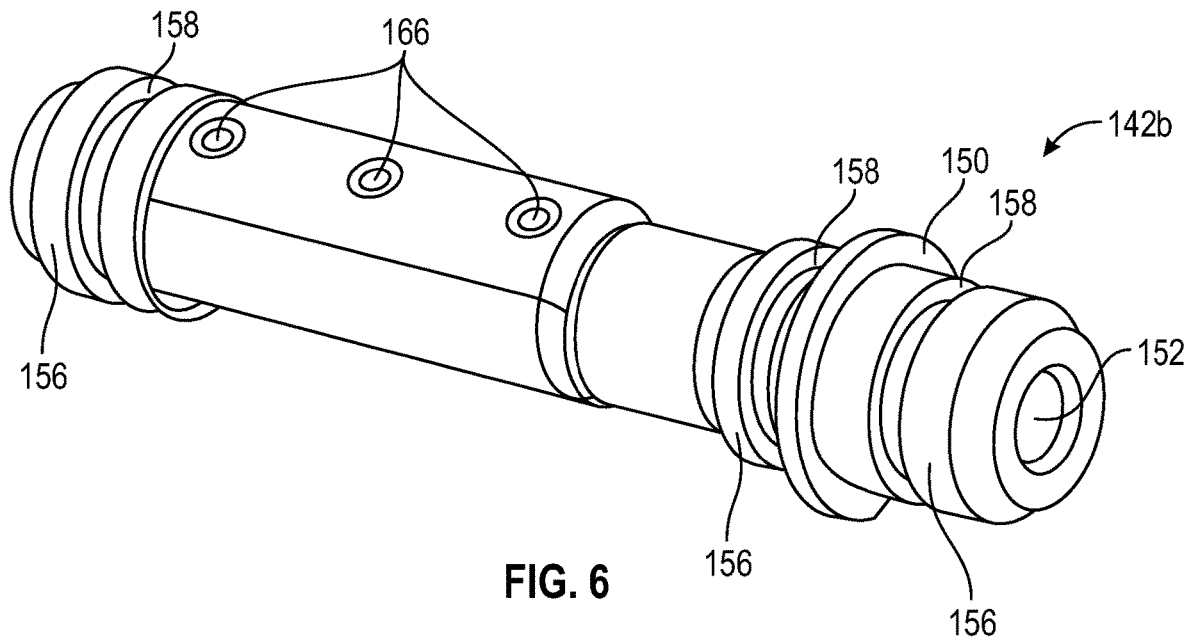
FIG. 6 is a schematic perspective view of a second embodiment of a sprinkler for a planet carrier according to the aspects of the present disclosure.

FIG. 6 illustrates an alternative embodiment of the sprinkler 142b in which its larger diameter section is replaced by an external annular collar 150 which is located between two external cylindrical surfaces 156. Each of these surfaces comprises an annular groove 158 for housing an O-ring seal (not shown).

As can be seen in FIG. 4, the bore 140 may be connected to further recesses 160, 160'. These recesses 160' may be configured and in particular sized to form oil spray orifices directly in the gearbox 106. Alternatively, the recesses 160 may be sized to accommodate additional sprinklers 142c, such as those shown in FIGS. 8 and 9.

The bore 140 may be connected to a plurality of recesses 160 spaced from its longitudinal ends, the recesses 160 preferably having an orientation transverse with respect to the bore 140 and to the axis X. In the example shown in FIG. 8, the recesses 160 extend in a same plane passing through the axis of the bore 140 and each recess 160 comprises an internal cylindrical surface for mounting and centring a sprinkler 142c.

Each sprinkler 142c is thus a transverse sprinkler in that it extends perpendicular to the axis X.

The sprinkler 142c is generally tubular in shape and comprises an external annular collar 150 for bearing on a surface of the bridge 113d into which the recess 160 opens.

The sprinkler 142c is intended to be engaged in the recess 160 until its collar 150 rests on this surface.

The sprinkler 142c comprises an external cylindrical centring surface 156 comprising a peripheral annular groove 158 for housing an O-ring seal (not shown) which cooperates with the internal surface of the recess 160.

The sprinkler 142c comprises a single oil spray orifice 166 and an internal passage 152 for fluidly communicating the orifice 166 with the bore 140. Here, the orifice 166 is formed at one end of the sprinkler 142b and the passage 152 and is thus aligned with the passage 152. It is not necessary to provide an indexing system for this type of sprinkler 142c.

This type of sprinklers 142c could be used to project oil to the gears between the toothings of a planet gear 116 and the sun gear 111 or between the toothings of a planet gear 116 and the ring gear 114.

In an embodiment not shown, at least one portion of the housing recesses of the sprinklers 142 could be inclined with a degree of inclination (other than 90°) relative to the bore 140.

The embodiments of the present disclosure in which an exclusive property or privilege is claimed are defined as follows:

1. A planet carrier for a mechanical gearbox for a turbomachine, the planet carrier comprising:
    a one-piece cage that extends about an axis of rotation defining an internal housing configured to receive a sun gear and planet gears of the gearbox, and
    a lubrication system comprising:
        a bore formed in the cage and extending parallel to the axis over more than 30% of a maximum axial dimension of the cage, and
        two sprinklers fitted on the cage, each sprinkler being mounted in a recess of the cage and comprising:
            an oil spray orifice, and
            an internal passage for fluidly communicating said orifice with said bore,
    wherein a first of the two sprinklers comprises a longitudinal sprinkler which extends in a direction parallel to the axis and is mounted in a recess which is directly connected to a longitudinal end of the bore.

2. The planet carrier of claim 1, wherein a second of the two sprinklers comprises a transverse sprinkler which extends in a direction perpendicular to the axis and which is mounted in a recess which is directly connected to the bore.

3. The planet carrier of claim 2, wherein the recess for mounting the transverse sprinkler is located at a longitudinal end of said bore.

4. The planet carrier according to claim 2, wherein the transverse sprinkler comprises a lateral orifice for fluidly communicating said bore with the passage of the transverse sprinkler.

5. The planet carrier of claim 2, wherein the recess for mounting the transverse sprinkler opens into said bore spaced from the longitudinal ends of said bore.

6. The planet carrier according to claim 1, wherein at least one of said sprinklers is tubular in shape and comprises a peripheral annular groove configured to receive an O-ring seal.

7. The planet carrier according to claim 1, wherein at least one of the sprinklers comprises an external cylindrical centering surface configured to cooperate directly with a complementary internal cylindrical surface of said cage.

8. The planet carrier of claim 7, wherein at least one of the sprinklers comprises two external cylindrical centering surfaces, spaced apart from each other.

9. The planet carrier according to claim 7, wherein at least one of the sprinklers comprises an indexing flat and/or an annular collar on its external cylindrical surface.

10. The planet carrier according to claim 1, wherein at least one of the sprinklers comprises two spray orifices, which are aligned one behind the other and are formed in an external boss of the sprinkler.

11. The planet carrier according to claim 1, wherein at least one of the sprinklers comprises a single spray orifice which extends directly into an extension of the internal passage of that sprinkler.

12. The planet carrier according to claim 1, wherein:
    the longitudinal sprinkler is connected directly to a longitudinal end of said bore;
    a second of the two sprinklers comprises a transverse sprinkler connected directly to an opposite longitudinal end of said bore; and
    further comprising at least one additional transverse sprinkler connected to said bore, spaced from the longitudinal ends of said bore.

13. A turbomachine, comprising a mechanical gearbox equipped with the planet carrier according to claim 1.

* * * * *